Jan. 17, 1961 E. P. ARTHUR ET AL 2,968,535
ULTRAMICRO ELECTRODE TITRATION ASSEMBLY
Filed April 3, 1958 3 Sheets-Sheet 2
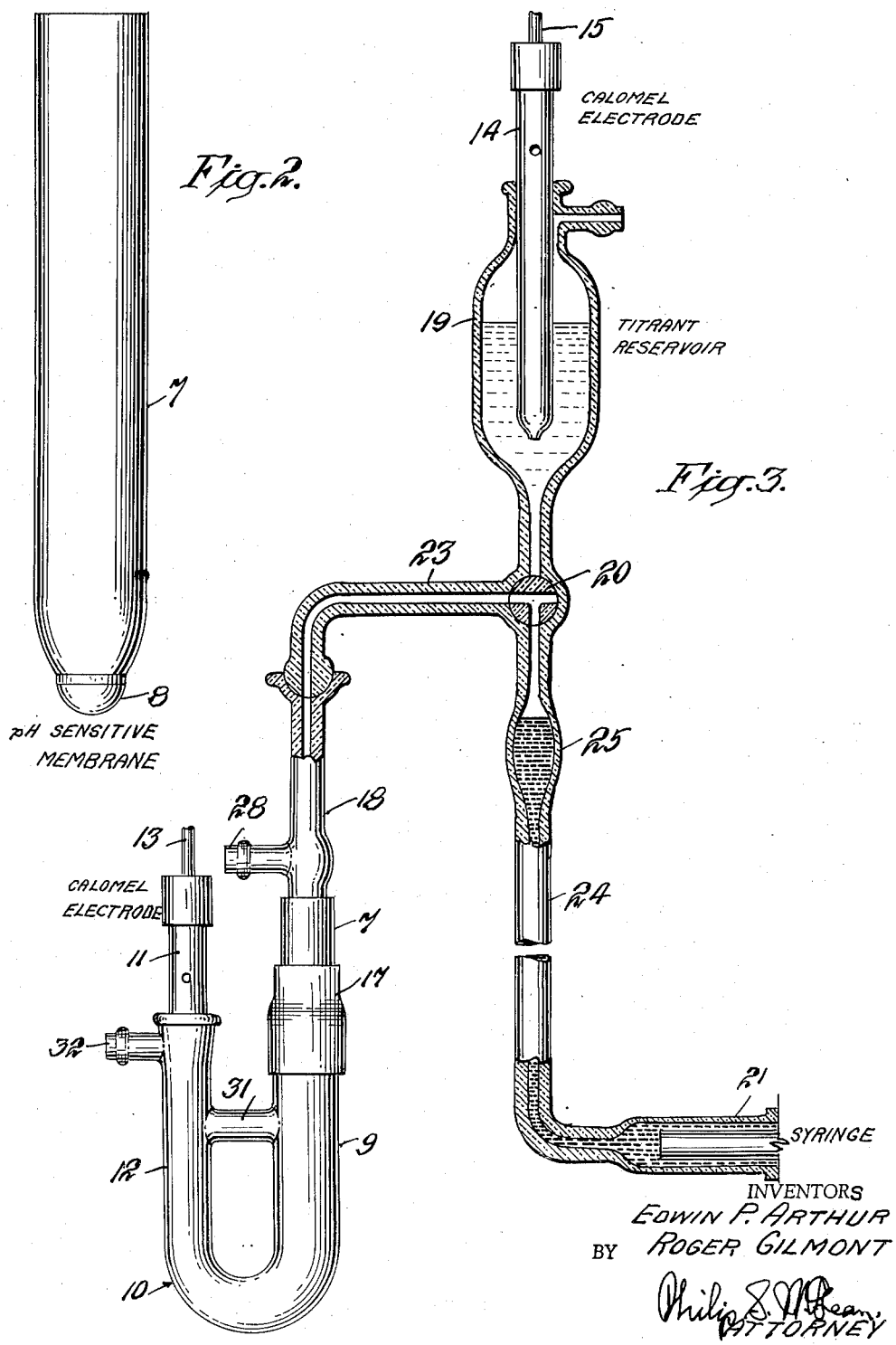
INVENTORS
EDWIN P. ARTHUR
BY ROGER GILMONT
ATTORNEY Jan. 17, 1961 E. P. ARTHUR ET AL 2,968,535
ULTRAMICRO ELECTRODE TITRATION ASSEMBLY
Filed April 3, 1958 3 Sheets-Sheet 3
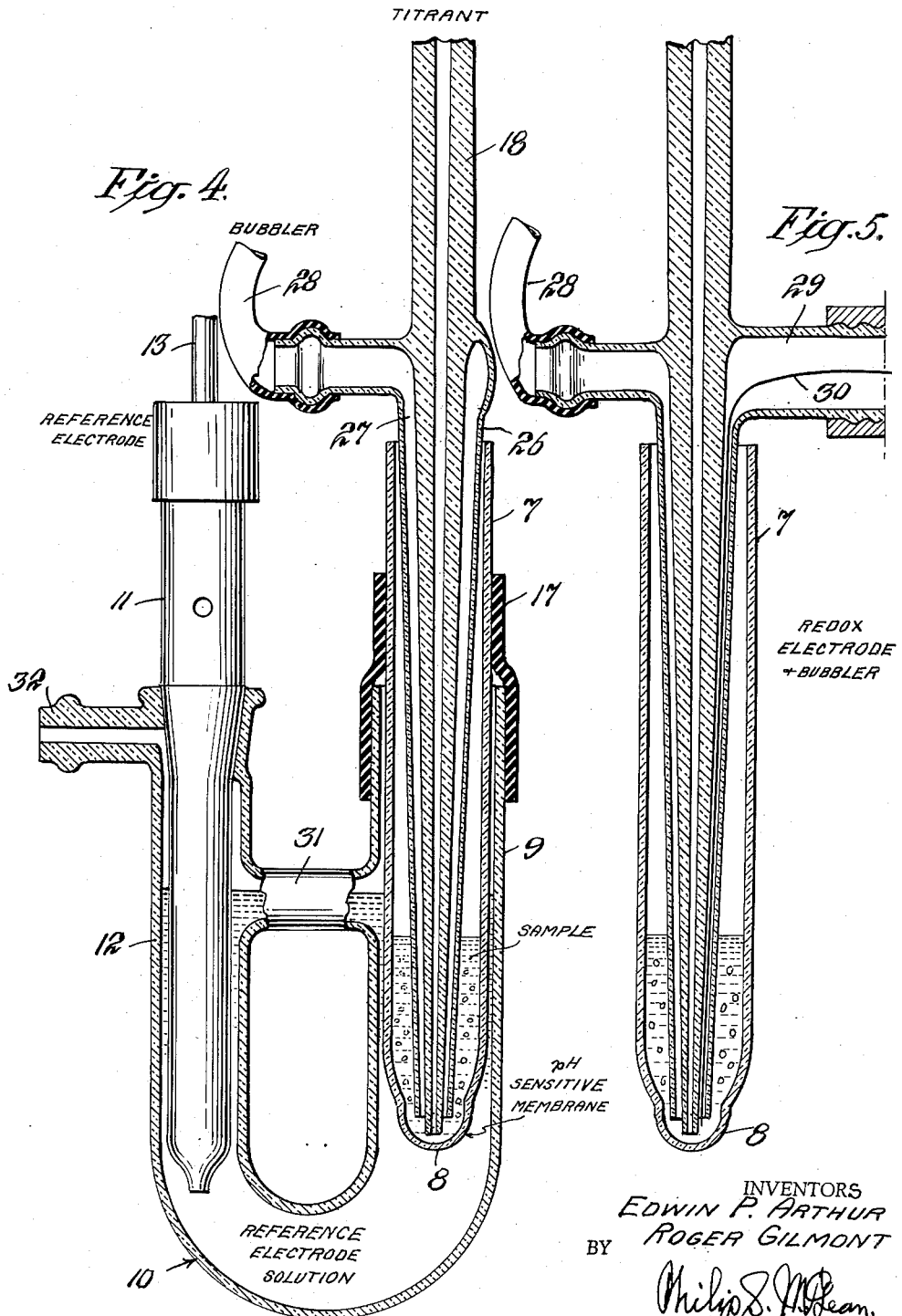
INVENTORS
EDWIN P. ARTHUR
ROGER GILMONT

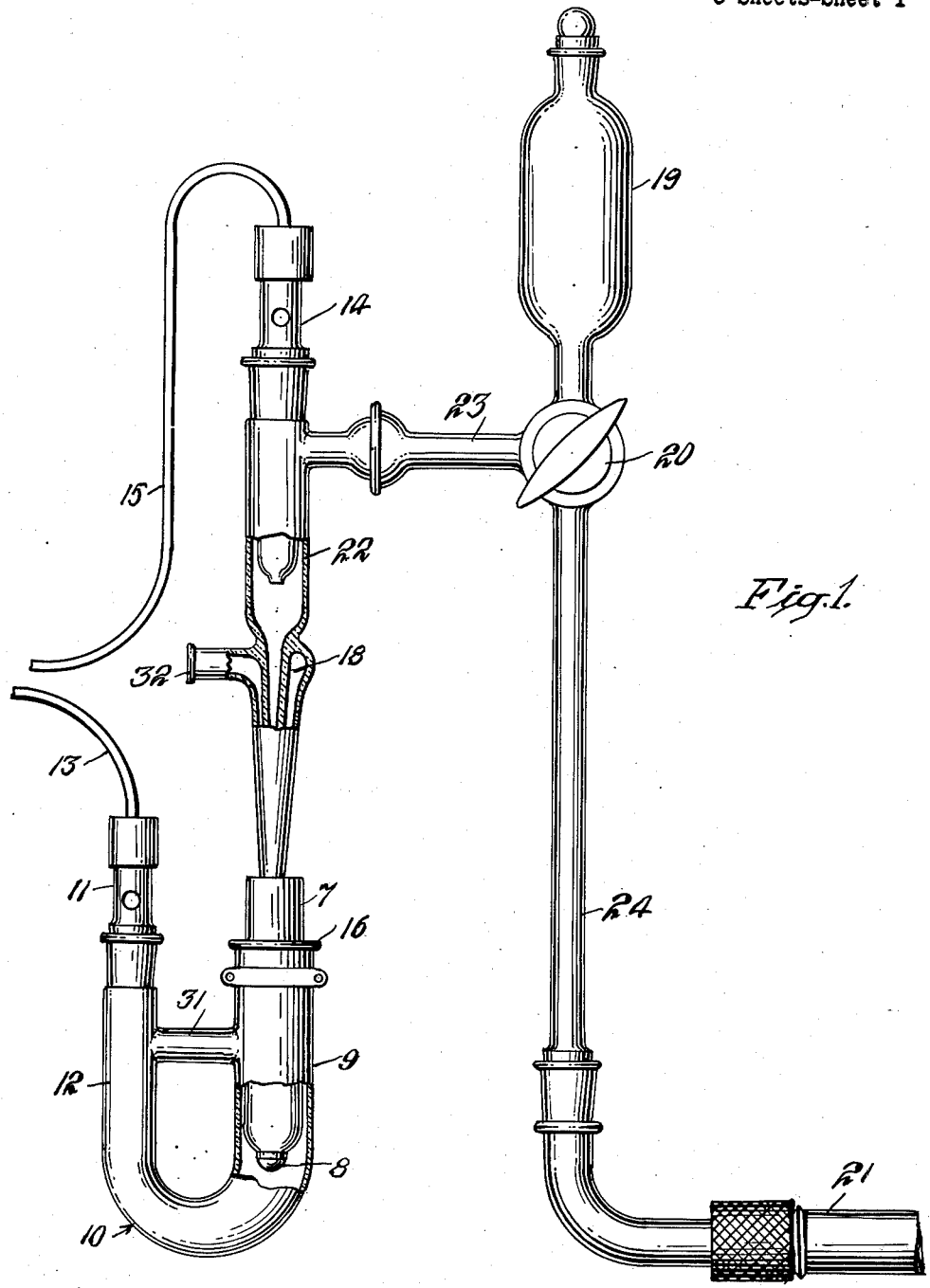

United States Patent Office 2,968,535
Patented Jan. 17, 1961

2,968,535

ULTRAMICRO ELECTRODE TITRATION ASSEMBLY

Edwin P. Arthur, Fullerton, Calif., and Roger Gilmont, Brooklyn, N.Y., assignors to Beckman Instruments, Inc., Fullerton, Calif., a corporation of California, and Manostat Corporation, New York, N.Y., a corporation of New York Filed Apr. 3, 1958, Ser. No. 726,100

12 Claims. (Cl. 23—253)

The invention herein disclosed relates to micrometric titration and aims to provide simplified, less bulky and otherwise improved equipment for such purposes.

The electromatic titration of micro quantities requires a special type of electrode assembly to meet the space requirements.

This is accomplished in the present invention by the combination of the glass electrode membrane and the container for the solution all in one unit.

In practice the pH sensitive glass membrane is sealed to form the bottom of a test tube like container, which then is made to serve as a container for the sample under test.

This glass electrode tube is mounted in one arm of a U tube containing the reference solution and to further meet requirements of space reduction, the buret tip, salt bridge to the second reference electrode and stirring mechanism are all combined in one unit.

The titrant itself then serves as the glass bridge to a reference calomel electrode and another calomel reference electrode is mounted in the other arm of the U tube.

Flow of current is thus established from the first reference electrode in the U-tube, through the reference solution, then through the glass membrane to the titrant and to the second reference electrode entered in the titrant.

By this particular combination and arrangement, direct positive measurement is effected with a small compact unit.

Other desirable objects attained by the invention and other novel features by which the results desired are accomplished are set forth and will appear in the course of the following specification.

The drawings accompanying and forming part of the specification are illustrative of present practical embodiments of the invention. Structure and arrangement however may be modified and changed as regards the immediate illustration, all within the true intent and scope of the invention as hereinafter defined and claimed.

Fig. 1 in the drawings is a front elevation, partly broken away and in section, of one form of the invention.

Fig. 2 is a front elevation on a larger scale of the glass electrode, sample container.

Fig. 3 is a broken, part sectional front elevation of a further development of the invention.

Fig. 4 is an enlarged broken part sectional view of the U-tube container for the reference electrode solution, with the reference electrode in one arm and the combination glass electrode, buret and stirrer or agitator in the other arm.

Fig. 5 is a broken sectional view showing how the combination glass electrode unit may be modified for oxidation reduction titration.

In the several views the glass electrode is indicated at 7, in the form of a test tube-like container for holding the sample to be titrated, having a pH sensitive glass membrane 8 sealed in and forming the bottom of the same.

This electrode is supported in one arm 9 of a U-tube form of container 10, holding the reference electrode solution.

A first reference calomel electrode 11 is supported in the other arm 12 of the U-tube, having a wire 13 for connection with a pH meter.

A second calomel reference electrode 14 is entered in the titrant and thereby connected in the glass bridge. This electrode has a conductor 15 connected to the other side of the pH meter.

The glass electrode 7 may be supported in the neck of the U-tube in various ways, as by a supporting collar insert, as indicated at 16, Fig. 1, or by a surrounding rubber sleeve, such as shown at 17 in Figs. 3 and 4.

Titrant is supplied to the buret 18 from a reservoir 19 under control of a three-way valve 20 under pressure furnished by the mercury syringe indicated at 21.

In the first illustrated form of the invention, Fig. 1, the second reference electrode 14 is entered in the titrant through the provision of the buret with an open titrant holding socket or well 22 at the upper end in which this electrode is seated.

This well receives titrant through a cross connection 23 from three-way valve 20.

In the second illustrated form of the invention, Fig. 3, the second electrode 14, the one in contact with the titrant, is entered and supported in the top of the titrant reservoir 19.

In this construction and arrangement conductivity through the closed stop cock is accomplished by using an ionic conducting stop cock lubricant, basically an agar mixture containing a salt.

The connection 24 extending from the syringe to the stop cock is shown as having an enlargement 25 providing a piston of mercury for lifting the titrant through the valve and expelling it through cross connection 23 to the microburet 18, without mixing the two.

Fig. 2 shows how the glass electrode sample container may be made of a straight length of tubing closed at the lower end by a sealed in pH sensitive glass membrane.

Fig. 4 shows how the buret tip, salt bridge to the second reference electrode and stirring mechanism may all be combined in the one unit by surrounding the buret tip with a second glass tube 26 providing a surrounding annular space 27 through which air or inert gas may be passed to vigorously agitate the solution being titrated. This gas or air is supplied to the bubbler through tube connections 28 at the top of the surrounding annular chamber.

Fig. 5 shows how the bubbler may be modified by provision at the top of a second inlet 29 through which a wire or wires 30 may be entered for carrying out redox titration.

The two arms of the U-tube solution holder are shown as having a cross connection 31 near the top to assure equal level of reference solution to both the glass electrode and the reference electrode entered in the arms of the container.

The U-tube also is shown as having a side connection 32 at the top of the reference electrodes leg for entry or draining off of reference solution, or other use.

The invention provides a simple, compact unit suitable for both manual and automatic titration, oxidation reduction and other operations.

The parts are few in number and are such as may be readily produced in glass at reasonable cost.

The microtitrator in the forms disclosed is a high precision instrument, simple to understand and operate, and free of delicate parts likely to get out of order.

Because of the high resistance of the glass membrane to ionic flow, problems of electrical leakage are present but have been reduced in this invention by treating all glass parts of this electrode with a hydrophobic coating of silicone. Contrary to what might be expected no significant increase in resistance results from this treatment. And while it might be first considered that the hydrophobic coating would seriously interfere with ionic passage through the glass membrane, no such effects have followed.

The container for the reference electrode solution while shown as a U-tube and generally so considered, may be varied in form to provide a holder for the reference solution and a means for supporting the glass electrode and first reference electrode in relatively spaced relation.

Special advantages follow from combining the glass electrode membrane and the container for the sample in one unit and making this as a unit separable from the holder for the reference electrode solution.

We claim:

1. Titration assembly comprising the combination of a holder containing reference solution, a first reference electrode entered in the reference solution contained in said holder, a glass electrode sample holder entered in the reference solution in said first mentioned reference solution holder spaced from said first reference electrode and comprising a tubular holder containing a sample for titration, said sample holder having a pH sensitive glass membrane sealed in and forming the bottom of the same and immersed in the reference solution in said reference solution holder, a buret entered in said glass electrode sample holder and extending down through the sample contained in said holder into close relation with the inner face of said glass membrane forming the bottom of said holder, means for supplying titrant down through said buret and through the sample to the inner face of said glass membrane and a second reference electrode insulated from the first reference electrode and entered in the titrant supplied to said buret.

2. The invention according to claim 1 in which said microburet has a socket in the upper end of the same holding a portion of the titrant and in which the second reference electrode is seated in said socket in contact with the titrant in said socket.

3. The invention according to claim 1 in which said means for supplying titrant includes a titrant reservoir connected with the microburet and in which the second reference electrode is seated in said titrant reservoir.

4. The invention according to claim 1 in which said means for supplying titrant includes a titrant reservoir and valve means for controlling passage of titrant from the reservoir to the microburet and in which an ionic conducting lubricant is applied to said valve means to complete electric conductivity when said valve means is closed against flow of titrant from the reservoir supplying titrant to the buret.

5. The invention according to claim 1 with means for bubbling an agitating gas about the tip of the microburet in the sample held in the glass electrode sample container.

6. The invention according to claim 5 in which said last mentioned means includes an annular passage about and extending to approximately the tip of the microburet and gas supply connections to said annular passage.

7. The invention according to claim 5 in which said last mentioned means includes an annular passage about and extending to approximately the tip of said microburet and in which an electrical conductor is extended down through said annular passage.

8. The invention according to claim 1 in which said titrant supply means includes a titrant reservoir and a syringe having a mercury column for impelling titrant from the reservoir to the microburet and in which the head of the mercury column is expanded into an enlarged head of mercury to prevent mixture of the titrant therewith.

9. The invention according to claim 1 in which said glass electrode and sample container is coated with ionic hydrophobic conducting silicone.

10. Titration assembly comprising the combination of a reference electrode solution holder and a glass electrode and sample container removably mounted in and separable from said reference electrode solution holder, said glass electrode and sample container comprising a tubular holder for a sample under test having a pH sensitive membrane sealed in the bottom of the same, and said holder having an ionic conducting hydrophobic coating.

11. A combined glass electrode and container for titration operations comprising a tubular holder for a sample under test, said holder having a thin pH sensitive membrane sealed in the bottom of the same and coated with an ionic conducting hydrophobic medium.

12. The invention according to claim 1 in which the holder for the reference solution is in the form of a U-shaped container and in which said first reference electrode is seated in one arm of said U-shaped container and the glass electrode sample holder is removably supported in the reference solution in the other arm of said U-shaped container and in which said container is equipped with a side connection in one of said arms for replenishment or release of reference solution in said container.

References Cited in the file of this patent

UNITED STATES PATENTS

| | | |
|---|---|---|
| 2,366,489 | Cary | Jan. 2, 1945 |
| 2,650,256 | Lingane | Aug. 25, 1953 |
| 2,667,075 | Blum | Jan. 26, 1954 |
| 2,797,150 | Rigby | June 25, 1957 |

FOREIGN PATENTS

| | | |
|---|---|---|
| 643,624 | Germany | Apr. 13, 1937 |

OTHER REFERENCES

Kerridge: J. Scient. Inst., vol. 3, September 1926, pp. 404–409.

Gilmont: Anal. Chem., vol. 20, 1948, pp. 1109–1111.